US009924047B2

(12) United States Patent
Terao

(10) Patent No.: US 9,924,047 B2
(45) Date of Patent: Mar. 20, 2018

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yoshihide Terao, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/551,872

(22) Filed: Nov. 24, 2014

(65) Prior Publication Data

US 2015/0156338 A1    Jun. 4, 2015

(30) Foreign Application Priority Data

Nov. 29, 2013    (JP) ................. 2013-248031

(51) Int. Cl.
G06F 3/12        (2006.01)
H04N 1/00       (2006.01)
H04N 1/32       (2006.01)

(52) U.S. Cl.
CPC ....... *H04N 1/0001* (2013.01); *H04N 1/00037* (2013.01); *H04N 1/00074* (2013.01); *H04N 1/32096* (2013.01); *H04N 1/32106* (2013.01); H04N 1/00217 (2013.01); H04N 1/00225 (2013.01); H04N 1/00244 (2013.01); H04N 2201/0036 (2013.01); H04N 2201/0094 (2013.01); H04N 2201/3208 (2013.01)

(58) Field of Classification Search
USPC .... 358/1.15, 1.18, 1.16, 468, 404, 400, 448; 709/203
See application file for complete search history.

(56) References Cited

U.S. PATENT DOCUMENTS

| 2005/0094637 | A1* | 5/2005 | Umesawa et al. ............ 370/389 |
| 2008/0307042 | A1* | 12/2008 | Honda et al. ............... 709/203 |
| 2010/0332624 | A1 | 12/2010 | Terao |
| 2012/0147418 | A1 | 6/2012 | Matoba |
| 2013/0167202 | A1* | 6/2013 | Kawai ............................. 726/4 |
| 2014/0289798 | A1* | 9/2014 | Kaneshiro ....................... 726/3 |
| 2015/0067778 | A1* | 3/2015 | Egawa et al. ................... 726/3 |

FOREIGN PATENT DOCUMENTS

| CN | 103327004 A | 9/2013 |
| EP | 2637122 A2 | 9/2013 |
| EP | 2642742 A1 | 9/2013 |
| JP | H10-117198 A | 5/1998 |

(Continued)

OTHER PUBLICATIONS

HowTo: Strato HiDrive, Apr. 24, 2015.
Synology Forum, Apr. 24, 2015.

*Primary Examiner* — Jerome Grant, II

(74) *Attorney, Agent, or Firm* — Canon U.S.A., Inc. IP Division

(57) ABSTRACT

An MFP receives destination information indicating a folder in a file server from a user and can register the destination information in an address book, and the MFP determines whether a connection with a file server using the destination information can be established after destination information is received but before the destination information is registered in the address book, and notifies a user of a determination result.

15 Claims, 16 Drawing Sheets

(56) References Cited

FOREIGN PATENT DOCUMENTS

| | | | |
|---|---|---|---|
| JP | 2002-217944 | A | 8/2002 |
| JP | 2006140763 | A | 6/2006 |
| JP | 2010140075 | A | 6/2010 |
| JP | 2011-234126 | A | 11/2011 |
| JP | 2011232884 | A | 11/2011 |
| JP | 2012123765 | A | 6/2012 |
| JP | 2013-110695 | A | 6/2013 |
| JP | 2013179436 | A | 9/2013 |

* cited by examiner

FIG. 5

| ADDRESS BOOK | | | |
|---|---|---|---|
| USER A | MAIL | user_a@abc.com | |
| USER B | FTP | server.ftp1.co.jp | |
| COMPANY C | SMB | server.smb.co.jp | 500 |
| USER D | WebDAV | server.webdav.co.jp | |
| COMPANY E | FTP | server.ftp2.co.jp | |
| BRANCH F | SMB | server.smb.co.jp | |
| BRANCH G | MAIL | user_g@abc.com | |

| CANCEL | OK | NEW REGISTRATION |
|---|---|---|
| 501 | 502 | 503 |

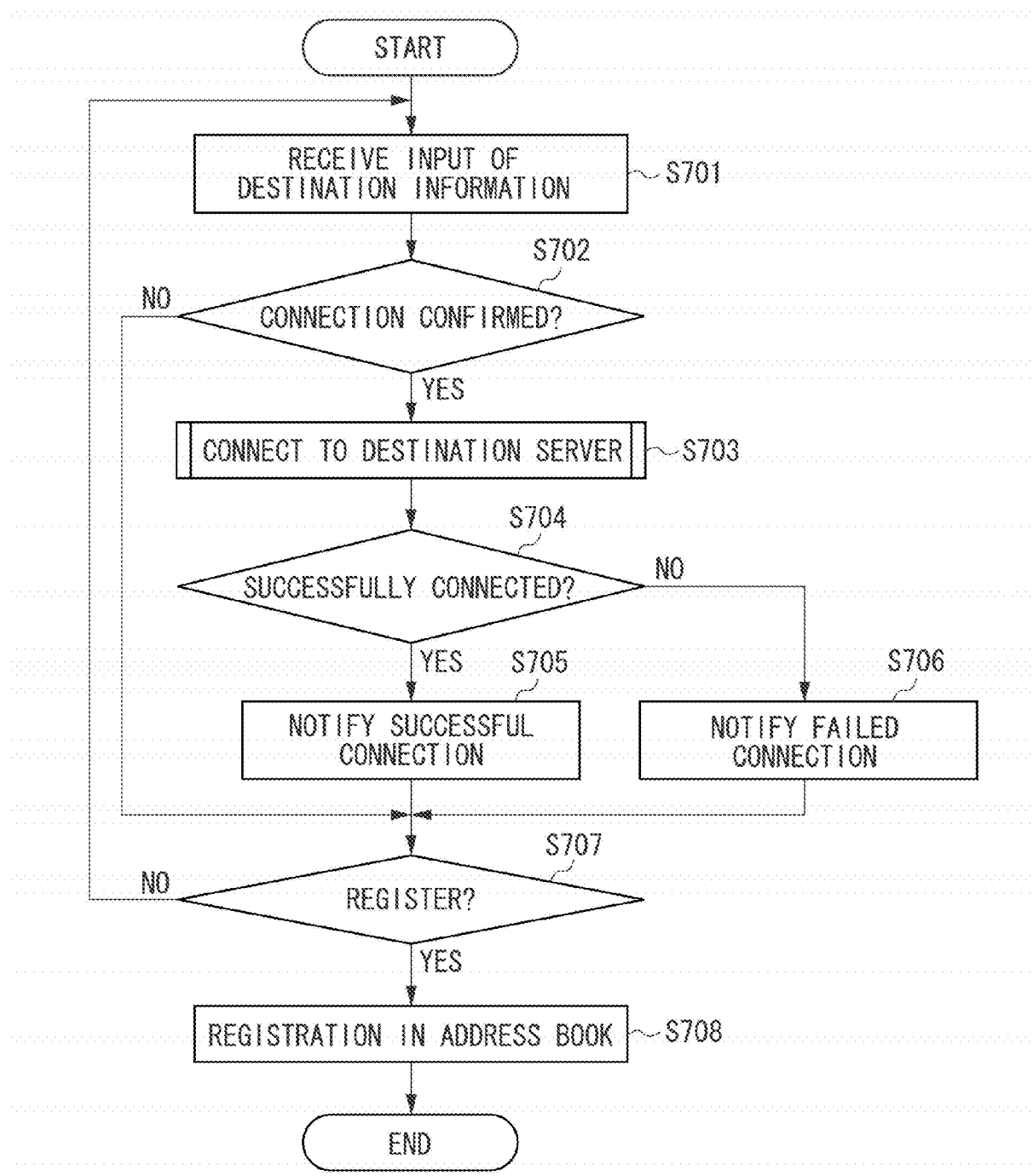

FIG. 10

```
┌─────────────────────────────────────────┐
│ ADDRESS CONFIRMATION                    │
│                                         │
│  ■ HOST NAME OF FOLDER                  │
│      ┌──────────────────────┐           │
│      │ server.smb.co.jp     │ ～1001    │
│      └──────────────────────┘           │
│  ■ PATH TO FOLDER                       │
│      ┌──────────────────────┐           │
│      │ /home/common         │ ～1002    │
│      └──────────────────────┘           │
│  ■ USER NAME                            │
│      ┌──────────────────────┐           │
│      │                      │ ～1003    │
│      └──────────────────────┘           │
│  ■ PASSWORD                             │
│      ┌──────────────────────┐           │
│      │                      │ ～1004    │
│      └──────────────────────┘           │
│                     ┌──────────┐        │
│                     │ TRANSMIT │ ～1005 │
│                     └──────────┘        │
└─────────────────────────────────────────┘
```

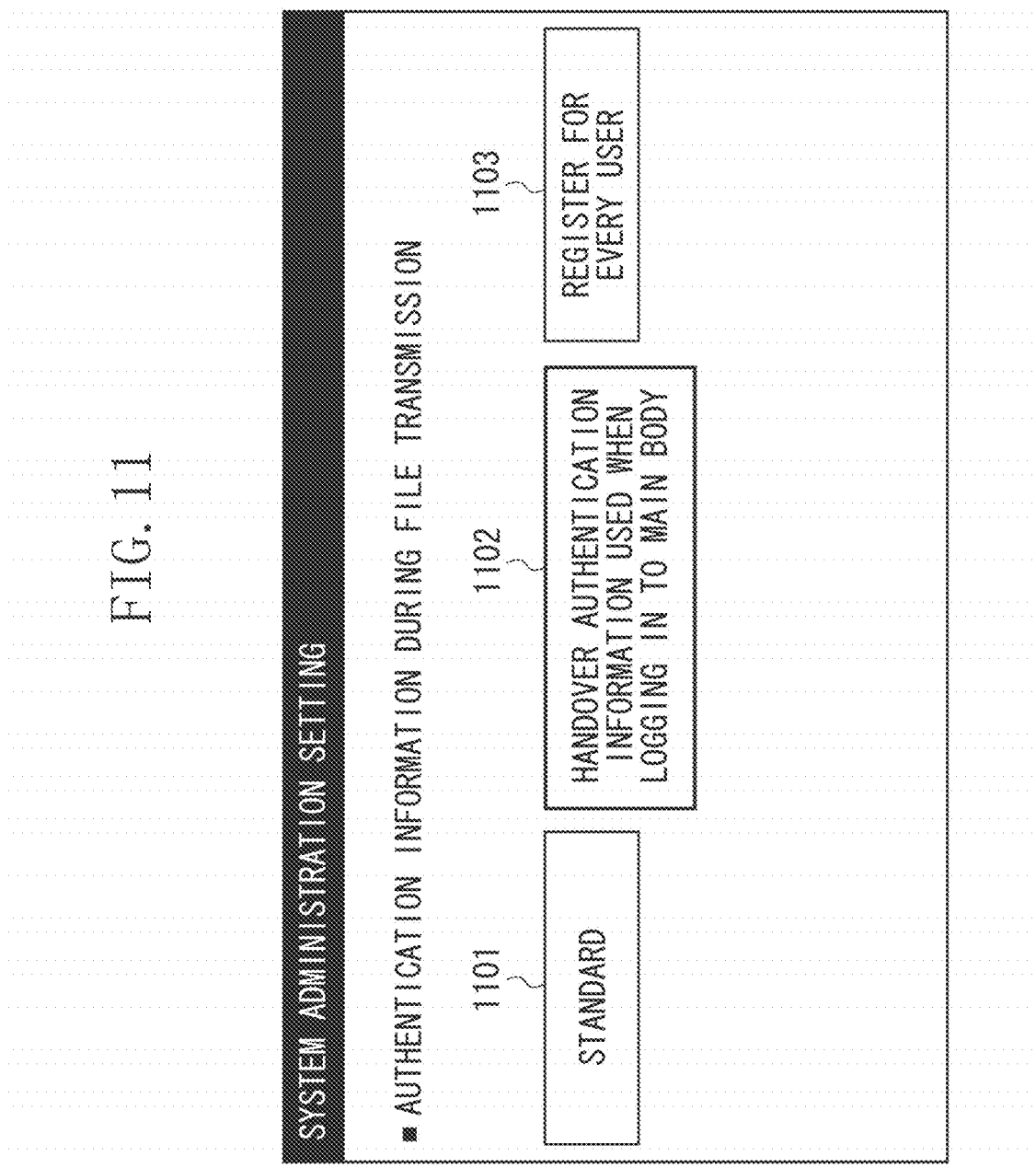

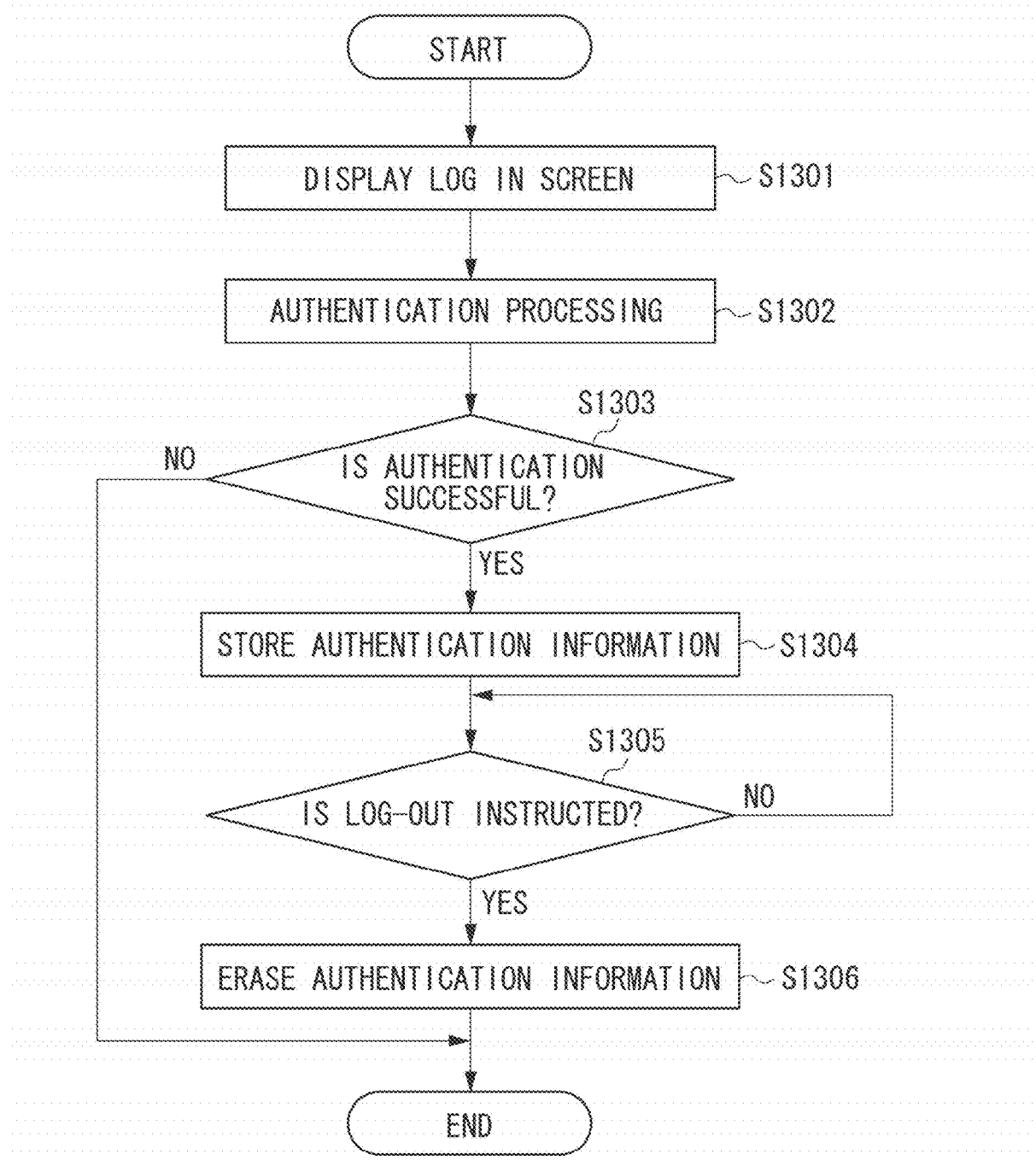

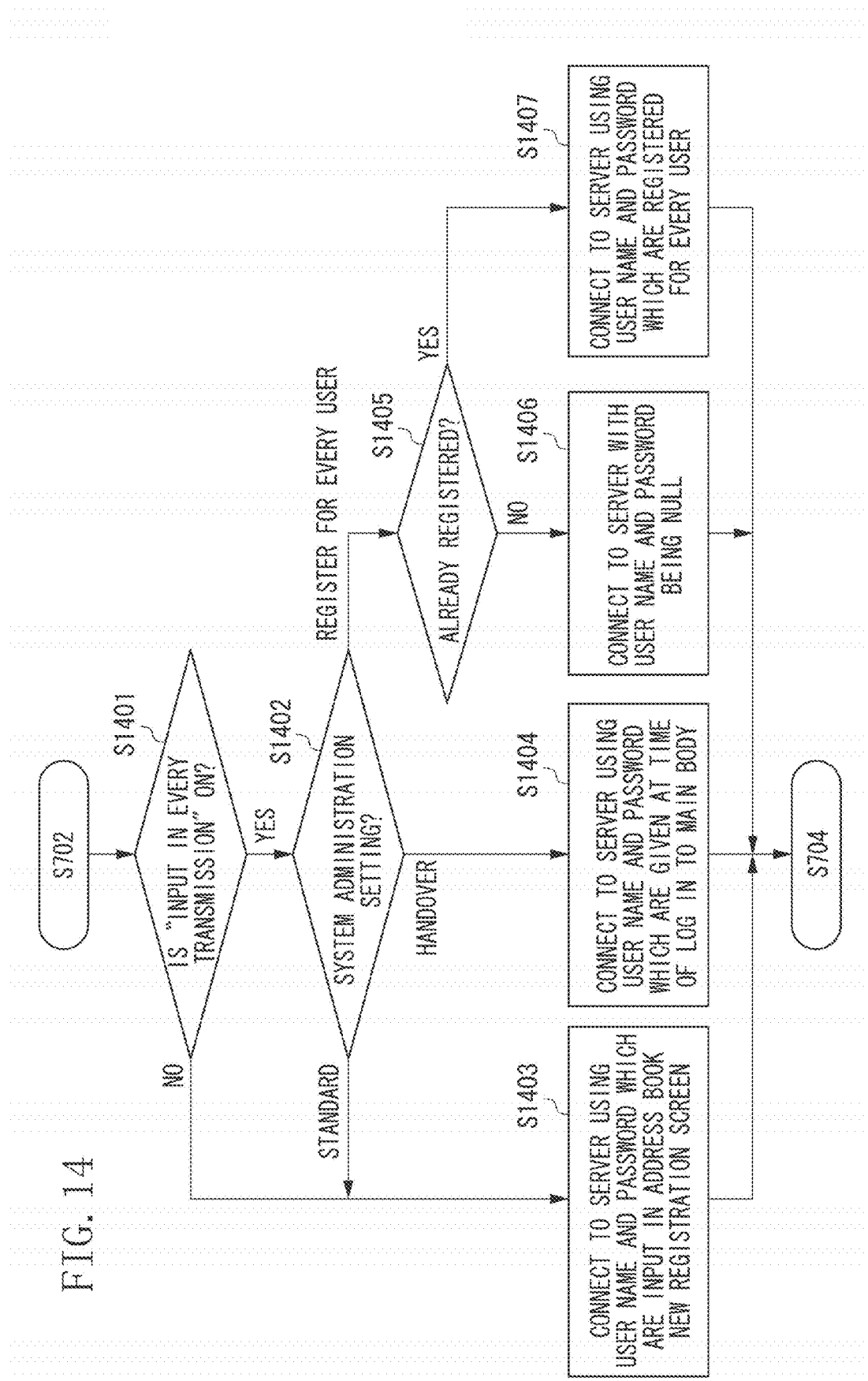

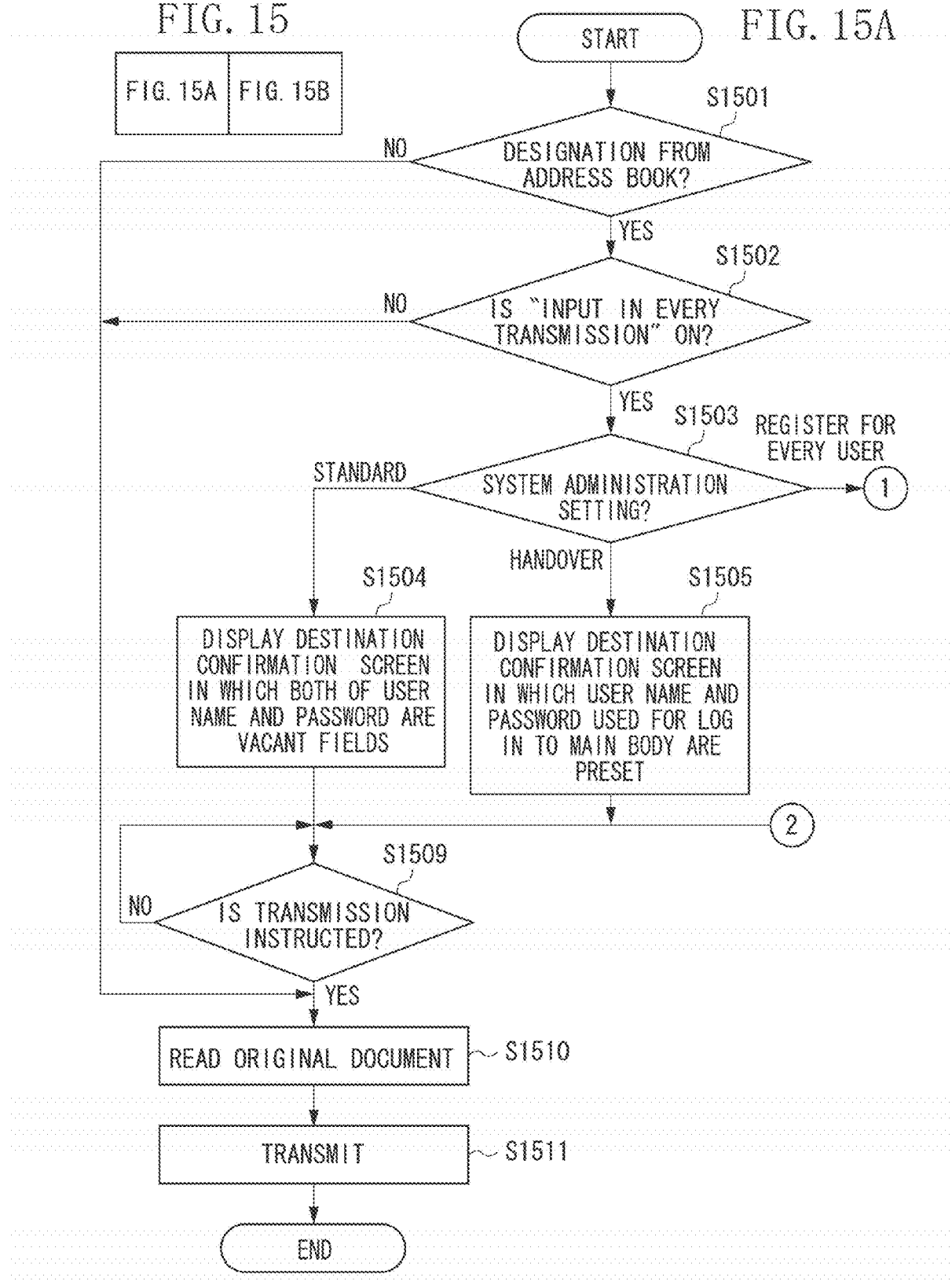

IMAGE PROCESSING APPARATUS, IMAGE PROCESSING METHOD, AND STORAGE MEDIUM

BACKGROUND OF THE INVENTION

1. Field of the Invention

An exemplary embodiment of the present invention relates to an image processing apparatus capable of transmitting image data to a file server.

2. Description of the Related Art

Conventionally, an image processing apparatus such as a multi function peripheral (MFP) is known, which transmits image data to a file server and stores the image data in a folder on the file server. As a transmission protocol used in such a case, for example, server message block (SMB) is known. In addition, file transfer protocol (FTP) and distributed authoring and versioning protocol for the WWW (Web-DAV) are known.

When image data are transmitted using such a transmission protocol, it is necessary to set destination information indicating a folder which becomes a storage destination of image data. The destination information includes a host name and a folder path allocated to a file server, and authentication information (user name and password) for accessing a folder.

It is troublesome for a user to input destination information every time image data is transmitted. Therefore, a technique for registering the destination information in an address book is known (Japanese Patent Application Laid-Open No. 2011-234126). A user who tries to transmit image data selects desired destination information from multiple pieces of destination information registered in an address book, so that the trouble in setting of the destination can be avoided.

When destination information is to be registered in the address book, destination information is given and received from the user, and the received destination information is registered in the address book. However, conventionally, even when the content of the destination information which is input by the user is incorrect, the content is registered in the address book while the user does not notice that the content is incorrect. Examples of mistakes in the content include a host name not existing on the network or incorrect authentication information.

If destination information having incorrect content is registered in the address book, when a user selects the destination information from the address book to transmit image data, a transmission error occurs after the user instructs execution of the transmission. At this point, the user finds the mistake in the destination information. In this case, it is necessary for the user to input the destination information all over again or to edit the content of the address book. Therefore, it is not user-friendly for a user who is in a hurry to do the work.

SUMMARY OF THE INVENTION

The present invention is directed to a system for preventing destination information having incorrect content from being registered in the address book.

An image processing apparatus according to an exemplary embodiment of the present invention includes a transmission unit configured to transmit image data to a file server, a reception unit configured to receive destination information indicating a folder in the file server, a registration unit configured to register the destination information received by the reception unit in an address book, a determination unit configured to determine whether a connection with the file server can be established using the destination information after the reception unit receives the destination information but before the destination information is registered in the address book, and a notification unit configured to notify a user of a determination result made by the determination unit.

Further features of the present invention will become apparent from the following description of exemplary embodiments with reference to the attached drawings.

BRIEF DESCRIPTION OF THE DRAWINGS

FIG. 5 is a figure illustrating an operation screen of an MFP according to an exemplary embodiment of the present invention.

FIG. 7 is a flowchart showing a new registration in an address book of an MFP according to an exemplary embodiment of the present invention.

FIG. 10 is a figure illustrating an operation screen of an MFP according to an exemplary embodiment of the present invention.

FIG. 11 is a figure illustrating an operation screen of an MFP according to an exemplary embodiment of the present invention.

FIG. 13 is a flowchart showing a log-in operation of an MFP according to an exemplary embodiment of the present invention.

FIG. 14 is a flowchart showing a new registration in an address book of an MFP according to an exemplary embodiment of the present invention.

FIGS. 15a and 15B are a flowchart showing a transmission operation of an MFP according to an exemplary embodiment of the present invention.

DESCRIPTION OF THE EMBODIMENTS

Various exemplary embodiments, features, and aspects of the invention will be described in detail below with reference to the drawings.

The following embodiment is not intended to limit the invention according to the scope of claims. It is to be understood that all combinations of the features described in the embodiment are not necessarily essential for the means of solution with the invention.

Figure 1:
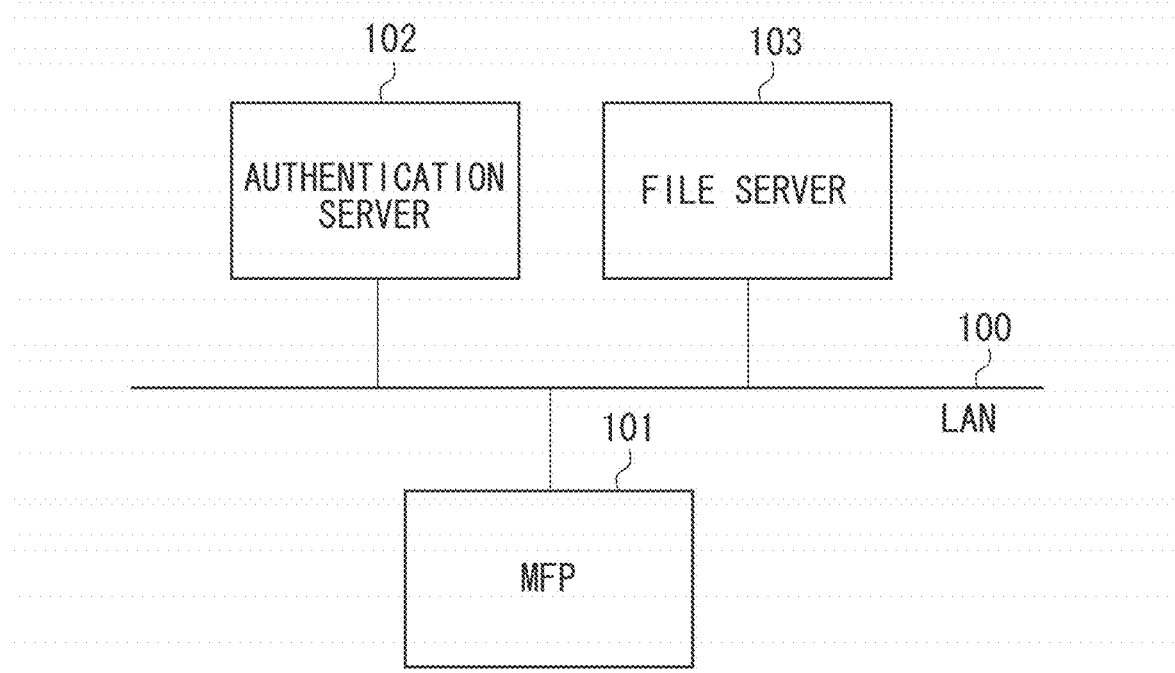
FIG. 1 is an overall view of an image processing system according to an exemplary embodiment of the present invention.

A first exemplary embodiment of the present invention will be described. FIG. 1 is an overall view of an image processing system. An MFP 101, an authentication server 102, and a file server 103 are connected to communicate with each other on a local area network (LAN) 100. The MFP 101 can transmit image data to a destination folder in the file server 103. In this case, the MFP 101 is described as an example of an image processing apparatus, but other types of apparatuses may be used as long as the apparatuses can transmit image data to the file server.

FIG. 1 illustrates a single file server 103, but more than one file server may exist on the LAN 100. The MFP 101 can transmit image data to the destination folder in each file server. Protocols such as SMB, FTP, and WebDAV can be used for transmission to the file server 103. The MFP 101 can also transmit image data via a mail server, not illustrated, using an e-mail.

The image processing system includes the MFP 101, the authentication server 102, and the file server 103. Only the MFP 101 and the authentication server 102 or only the MFP 101 may be referred to as an image processing system.

Figure 2:
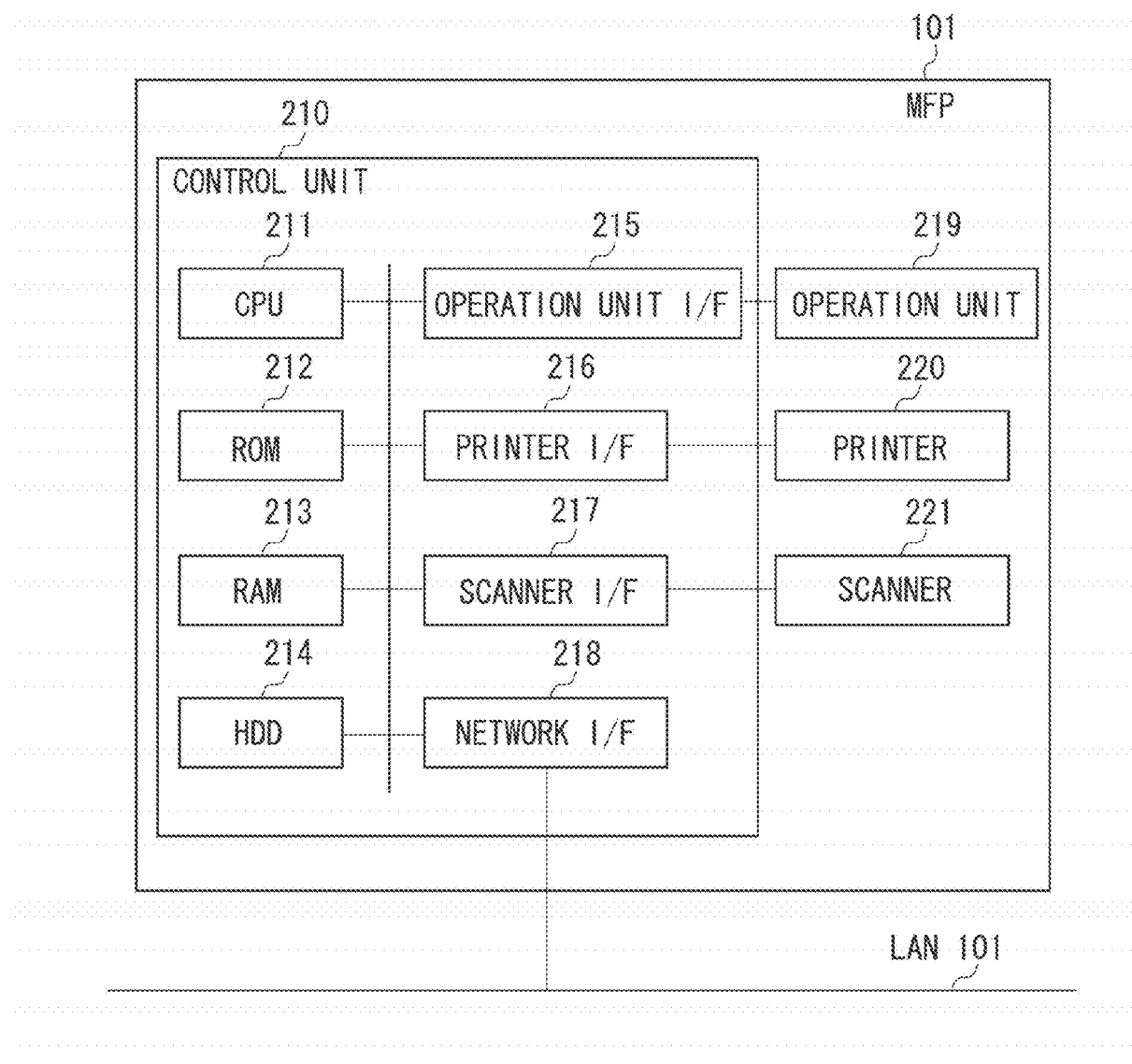
FIG. 2 is a block diagram illustrating a configuration of an MFP according to an exemplary embodiment of the present invention.

FIG. 2 is a block diagram illustrating a configuration of the MFP 101. A control unit 210 including a central processing unit (CPU) 211 controls operation of the entire MFP 101. The CPU 211 reads a control program stored in a read only memory (ROM) 212 to perform various kinds of control such as reading control and transmission control. A random access memory (RAM) 213 is used as a temporary storage area such as a main memory and a work area for the CPU 211. In the case of the MFP 101, the single CPU 211 uses the single memory (the RAM 213 or a hard disk (HDD) 214) to execute each processing illustrated in a flowchart described below, but the configuration may be formed otherwise. For example, two or more CPUs and two or more RAMs or HDDs may cooperate with each other to execute each processing illustrated in the flowchart described below.

The HDD 214 stores image data and various kinds of programs. An operation unit interface (I/F) 215 connects an operation unit 219 and the control unit 210. The operation unit 219 includes a liquid crystal display unit having a touch panel function and a keyboard, and functions as a reception unit configured to receive a user's operation and various kinds of information.

A printer I/F 216 connects a printer 220 and the control unit 210. The image data to be printed by the printer 220 are transferred via the printer I/F 216 from the control unit 210, and are printed on a recording medium by the printer 220.

A scanner I/F 217 connects a scanner 221 and the control unit 210. The scanner 221 reads an image on an original document to generate image data, and inputs the image data via the scanner I/F 217 into the control unit 210. The MFP 101 can convert the image data generated by the scanner 221 into any given file format, and transmit the image data to the file server or transmit the data by mail.

A network I/F 218 connects the control unit 210 (MFP 101) with the LAN 100. For example, the network I/F 218 transmits image data and information to an external apparatus on the LAN 100 (such as the authentication server 102 and the file server 103), or receives various kinds of information from an external apparatus on the LAN 100.

Figure 3:
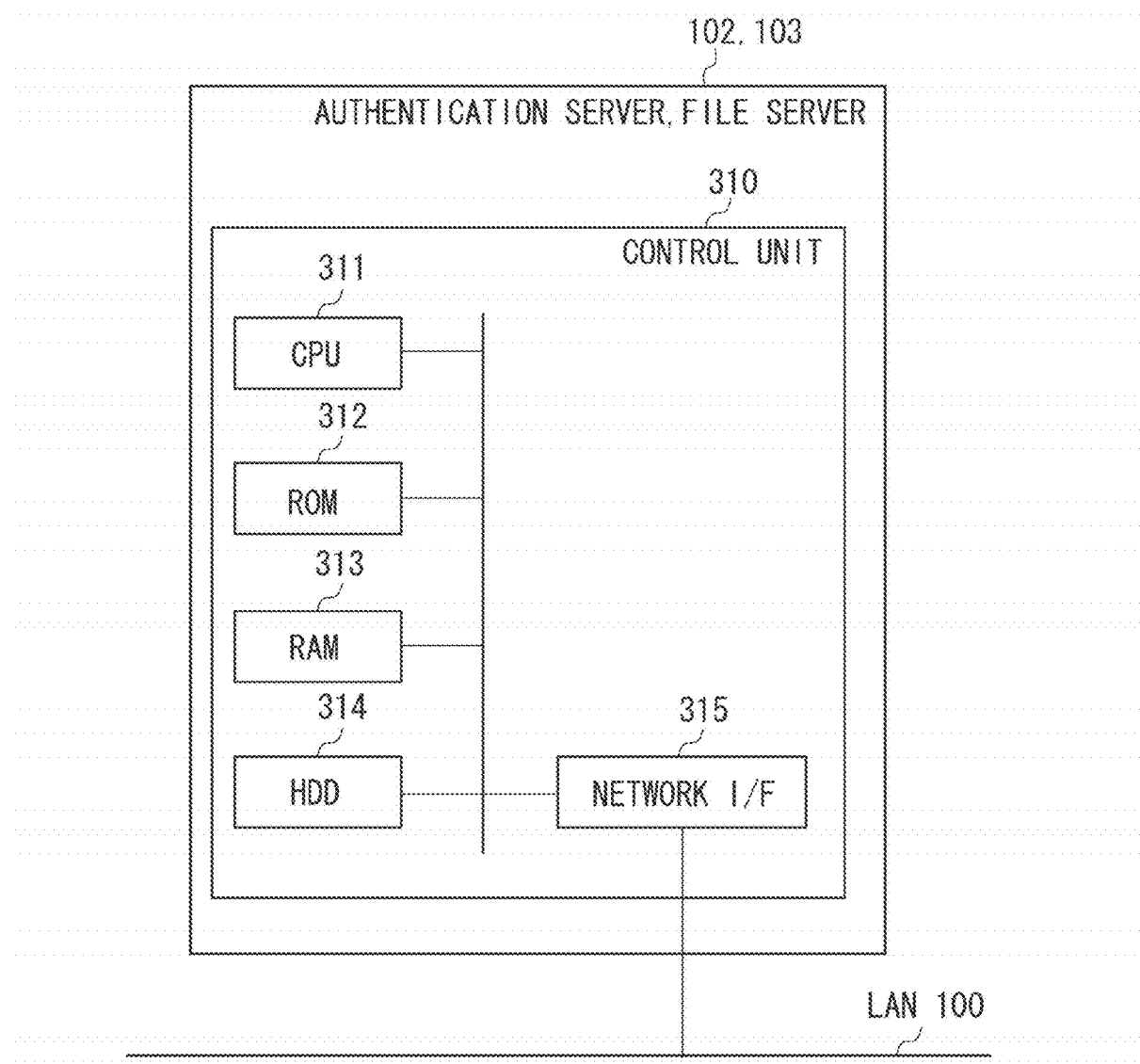
FIG. 3 is a block diagram illustrating a configuration of an authentication server and a file server according to an exemplary embodiment of the present invention.

FIG. 3 is a block diagram illustrating a configuration of the authentication server 102. A control unit 310 including a CPU 311 controls the entire operation of the authentication server 102. The CPU 311 executes various kinds of control processing by reading the control program stored in the ROM 312. A RAM 313 is used as a temporary storage area such as a main memory and a work area for the CPU 311. A HDD 314 stores image data and various kinds of program.

A network I/F 315 connects the control unit 310 (authentication server 102) to the LAN 100. The network I/F 315 transmits and receives various kinds of information to and from another apparatus on the LAN 100. The configuration of the file server 103 is the same as that of the authentication server 102.

Figure 4:
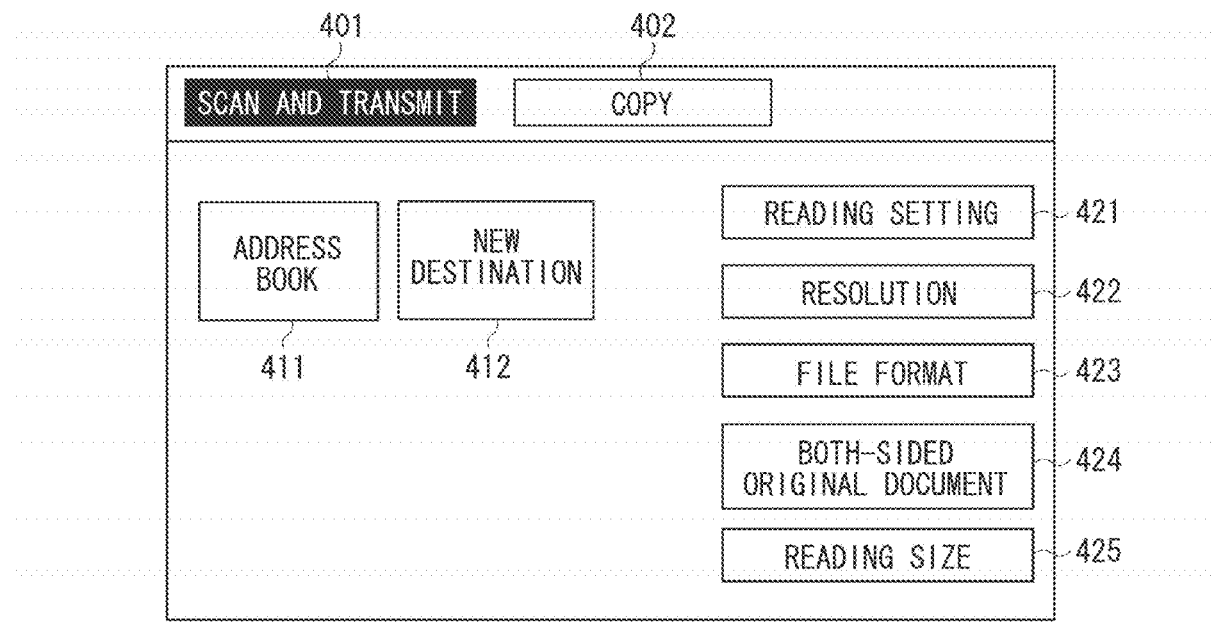
FIG. 4 is a figure illustrating an operation screen of an MFP according to an exemplary embodiment of the present invention.

FIG. 4 is a figure illustrating an example of operation screen displayed on the operation unit 219. The user operates an operation key 401 or 402 on the screen of FIG. 4, so that the function can be selected. FIG. 4 illustrates the state in which the operation key 401 is selected. FIG. 4 illustrates "scan and transmit" and "copy" as the functions as an example. However, the MFP 101 may have other kinds of functions.

The user who has selected the operation key 401 controls an operation key 411 or 412, so that the destination of image data to be transmitted can be set. When the user controls the operation key 411, and the content of the address book held in the HDD 214 is displayed, and the user refers to the content registered in the address book, and the user can designate the destination of image data. When the user controls the operation key 412, a screen for receiving new destination information from the user is displayed. The user can input destination information via the displayed screen to designate the destination of the image data.

An operation key 421 is used to perform image reading setting such as color/black-and-white. An operation key 422 is used to set the reading resolution. An operation key 423 is used to set a file format of image data to be transmitted. An operation key 424 is used to set single side/both-sides reading. An operation key 425 is used to set the reading size.

FIG. 5 is a figure illustrating an example of operation screen displayed on the operation unit 219. The operation screen on FIG. 5 is displayed when the user controls an operation key 411 of FIG. 5. The destination information registered in an address book is displayed in list form in a destination information display area 500. In a left-side column, the destination name given to each destination information is displayed. In the central column, the type of each destination (information indicating a transmission protocol) is displayed. In a right-side column, address information included in each destination information is displayed. When the type of destination is a mail, the address information is a mail address, and when the type of destination is a file server (SMB, FTP, WebDAV), the address information is a host name. When the type of destination is a file server, not only a host name but also a folder path may also be displayed.

When the user presses down an operation key 501, the designation of the destination referenced to the address book is cancelled, and the screen of FIG. 4 is displayed again. When the user presses down an operation key 502 while selecting one or multiple pieces of destination information displayed on the destination information display area 500, the selected destination information is fixed. When the user presses down an operation key 503, the destination information can be newly registered in the address book.

Figure 6:
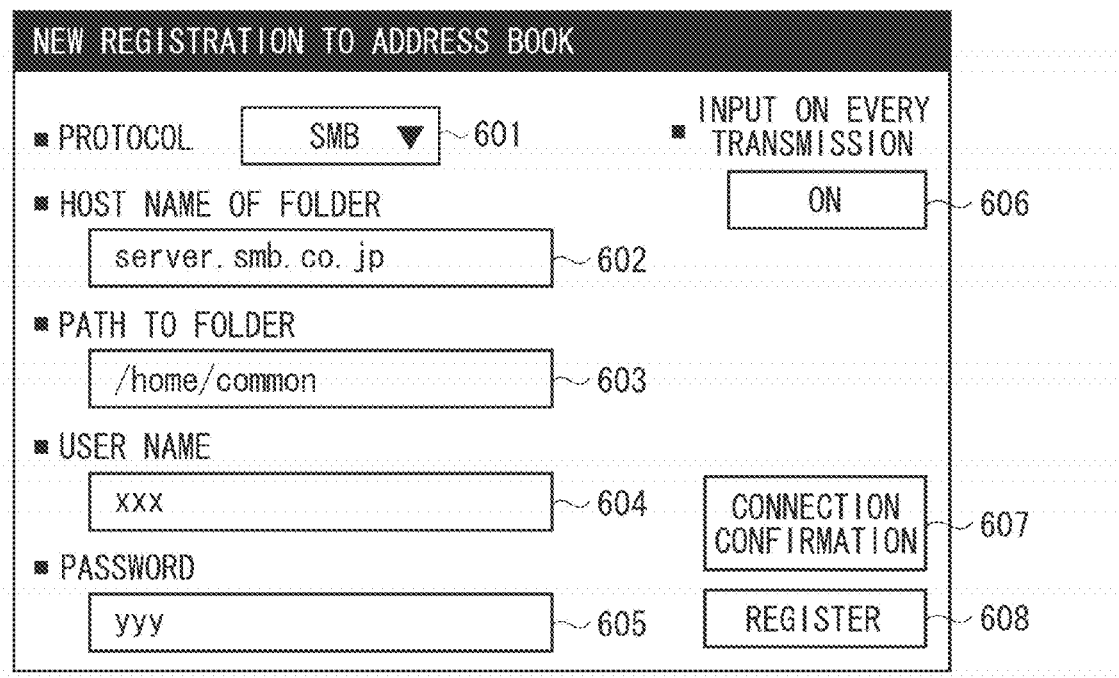
FIG. 6 is a figure illustrating an operation screen of an MFP according to an exemplary embodiment of the present invention.

FIG. 6 is a figure illustrating an example of an operation screen displayed on the operation unit 219. The operation screen as illustrated in FIG. 6 is displayed when the user presses down an operation key 503 and thereafter selects a file server (SMB, FTP, WebDAV) as the type of destination.

When the mail is selected as the type of destination, a mail address input screen, not illustrated, is displayed.

In an input field 601, a transmission protocol can be selected. In this case, SMB, FTP, WebDAV are displayed in list form in a dropdown format, and the user selects any one of them. In an input field 602, the user inputs the host name of the file server. In an input field 603, the user inputs the folder path in the file server. In input fields 604 and 605, the user inputs authentication information (user name and password) for accessing the folder.

In an input field 606, the user can select whether to input the authentication information in every transmission. If "ON" is selected, a destination confirmation screen (FIG. 10) described below is displayed when the user instructs transmission of image data (when the user presses down the start key). Then, image data is transmitted using authentication information which is newly input by the user on the destination confirmation screen instead of using the authentication information which is input to the input fields 604 and 605 (the authentication information which is registered in the address book). If "OFF" is selected, the destination confirmation screen is not displayed when transmission of image data is instructed (when the start key is pressed down), and image data is transmitted using authentication information which is input to the input fields 604 and 605 (the authentication information registered in the address book).

When the user presses down an operation key 607, whether connection can be established with the file server is determined in accordance with a flowchart as illustrated in FIG. 7, and a result of the determination is notified to the user as illustrated in FIG. 8. Therefore, the user can confirm whether connection can be established with the file server using information which is input to the input fields 601 to 605. When the user presses down an operation key 608, the destination information which is input to the input fields 601 to 606 is registered in the address book.

FIG. 7 is a flowchart showing address book new registration operation to be performed in the MFP 101. Each operation (step) illustrated in the flowchart of FIG. 7 is realized by the CPU 211 of the MFP 101 executing the control program stored in the HDD 214. The flowchart of FIG. 7 is started when the operation screen illustrated in FIG. 6 is displayed.

In step S701, the CPU 211 receives the destination information input into the input fields 601 to 606. In step S702, a determination is made as to whether a connection confirmation has been instructed (whether the user presses down the operation key 607). When it is determined that the connection confirmation has been instructed (Yes in step S702), the processing proceeds to step S703. When it is determined that the connection confirmation has been instructed (No in step S702), the processing proceeds to step S707.

In step S703, the CPU tries to connect to the file server (access a folder) using information which is input in the input fields 601 to 605. Then, in step S704, a determination is made as to whether connection with the file server tried in step S703 has been successfully completed. In this case, whether the connection to the file server has been successfully completed is treated as a result of the determination. More specifically, when it is determined that the connection to the file server has been successfully completed (Yes in step S704), the processing proceeds to step S705, and when it is determined that the connection to the file server has failed (No in step S704), the processing proceeds to step S706.

Figure 8A:
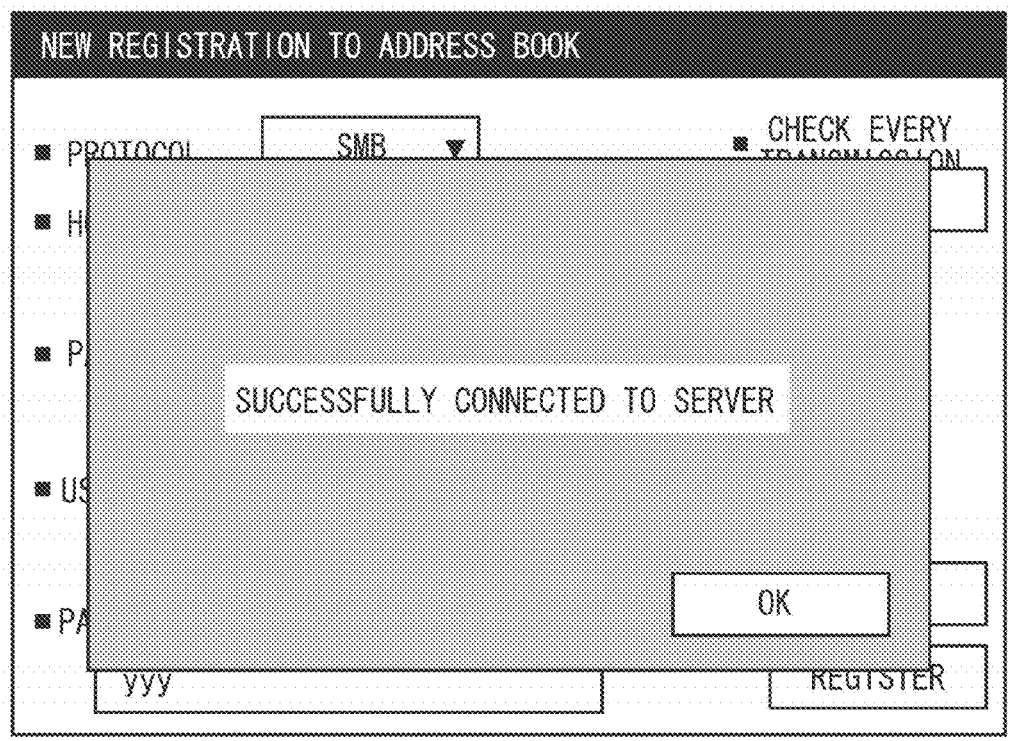
FIGS. 8A and 8B are figures illustrating an operation screen of an MFP according to an exemplary embodiment of the present invention.
Figure 8B:
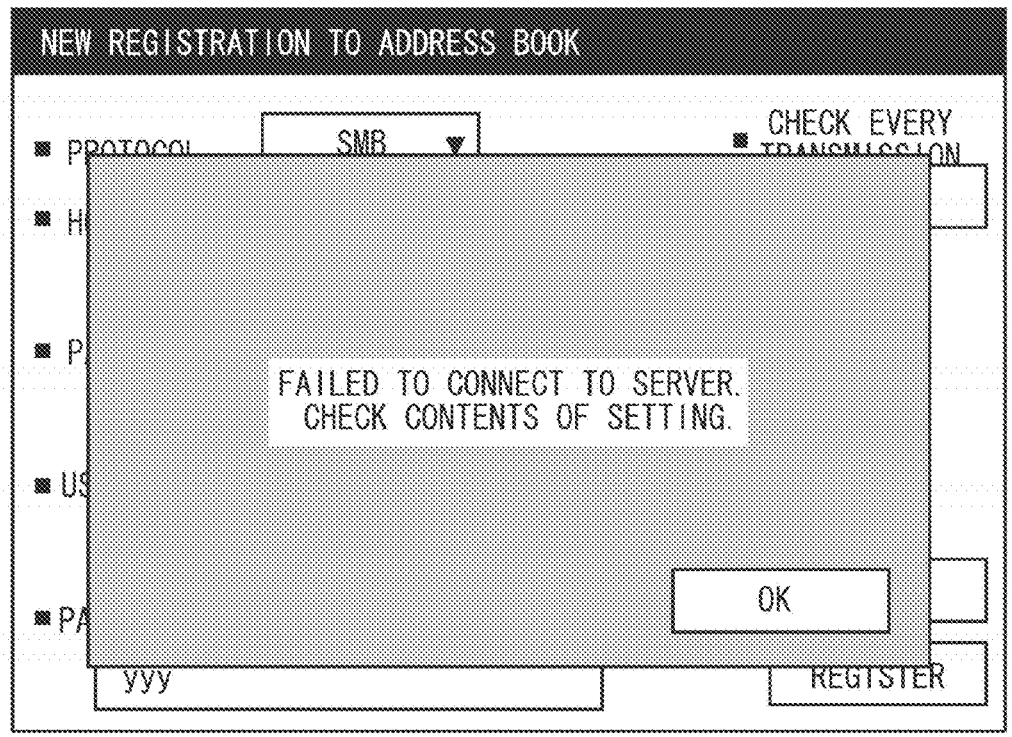

FIG. 8A is a connection determination result notifying screen displayed in step S705. A message indicating that the connection with the file server has been successfully completed is described as illustrated in the drawing. FIG. 8B is a connection determination result notifying screen displayed in step S706. A message indicating that the connection with the file server has failed and the user is advised to check the content of setting (information which is input to the input fields 601 to 605) appears as illustrated in the drawing. The reason why the connection cannot be made (the reason why the connection has failed) may be further described in the screen illustrated in FIG. 8B. Examples of reasons include a failure to connect to network, a failure to find the host name, a failure to find the folder, and incorrect user name or password.

In step S707, a determination is made as to whether registration has been instructed (whether the user presses down the operation key 608). When it is determined that the registration has been instructed (Yes in step S707), the processing proceeds to step S708, and when it is determined that the registration has not been instructed (No in step S707), the processing returns back to step S701. In step S708, information which is input to the input fields 601 to 606 is registered in the address book (an information database stored in the HDD 214).

Figure 9:
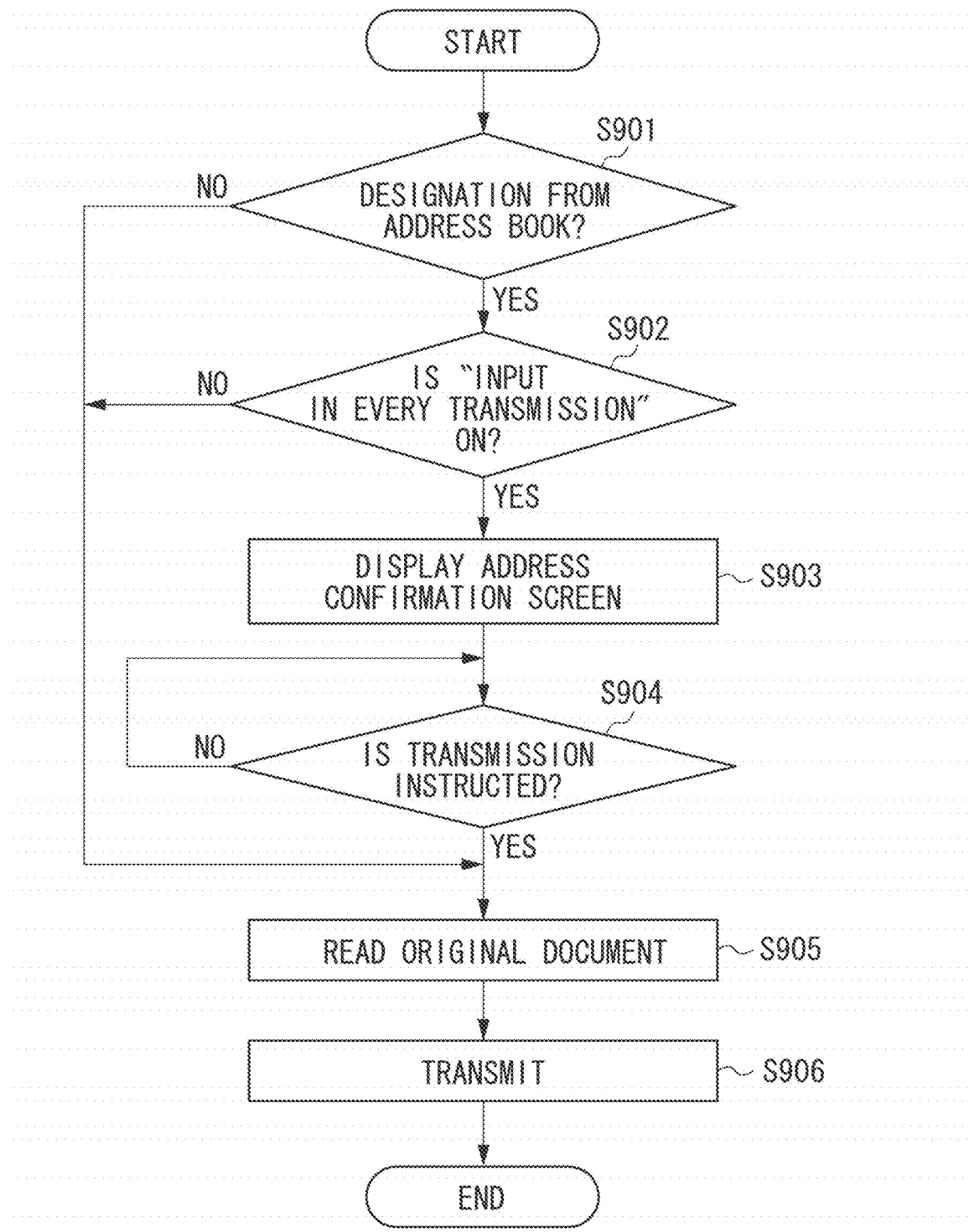
FIG. 9 is a flowchart showing transmission operation of an MFP according to an exemplary embodiment of the present invention.

FIG. 9 is a flowchart showing transmission operation performed in the MFP 101. Each operation (step) illustrated in the flowchart of FIG. 9 is realized by the CPU 211 of the MFP 101 executing the control program stored in the HDD 214. The flowchart of FIG. 9 is started when transmission of image data is instructed (when the start key is pressed down). FIG. 9 corresponds to a case where a file server is designated as a destination type. When a mail is designated as the destination type, transmission operation is executed according to a flowchart, not illustrated.

In step S901, the CPU 211 determines whether the destination is designated by referring to the address book. When the CPU 211 determines that the destination is designated by referring to the address book (Yes in step S901), the processing proceeds to step S902. When the CPU 211 determines that the destination is not designated by referring to the address book (No in step S901, that is, it is a destination which the user has newly input with the operation key 412), the processing proceeds to step S905.

In step S902, the CPU 211 determines whether the content which is input in the input field 606 is ON. When the CPU 211 determines that the content which is input in the input field 606 is ON (Yes in step S902), the processing proceeds to step S903. When the CPU 211 determines that the content which is input in the input field 606 is not ON (which means OFF) (No in step S902), the processing proceeds to step S905.

In step S903, the destination confirmation screen illustrated in FIG. 10 is displayed (i.e., editing disabled). The destination confirmation screen includes input fields 1001 to 1004. The input fields 1001 and 1002 are displayed in a grayed-out state, and the host name and the folder path which are input to the input fields 602 and 603 of FIG. 6 and registered in the address book are preset in the input fields 1001 and 1002. The input fields 1003 and 1004 are displayed as blank fields, and the user inputs the authentication information (user name and password) for accessing a folder.

Thus, the user is prompted to input authentication information in every transmission, for example, in a case where the authentication information which is set to the folder of the file server is frequently changed. Another example is a case where the level of security is raised to prevent anyone from easily accessing the folder.

In step S904, the CPU 211 determines whether transmission is designated (whether the user presses down an operation key 1005). When the CPU 211 determines that transmission is designated (Yes in step S904), the processing proceeds to step S905. When the CPU 211 determines that transmission is not designated (No in step S904), the processing waits until the transmission is designated. The operation key 1005 may be disabled until the user enters input to the input fields 1003 and 1004.

In step S905, the CPU 211 controls the scanner 221, and generates image data by reading an image on an original document. In step S906, the destination folder is accessed by using the destination information which is input on the destination confirmation screen, and the image data generated in step S905 are transmitted. When the destination is not designated by referring to the address book (it is a destination which is newly input using the operation key 412), then the folder is accessed by using the host name, the folder path, the user name, and the password which are newly input by the user. When the content which is input in the input field 606 is determined not to be ON (which means OFF), the folder is accessed by using the destination information which is input to the input fields 601 to 605 and registered in the address book.

As described above, the user can confirm before the registration in the address book, whether the connection with the file server can be established (more specifically, whether the content which has been input is incorrect) by making a determination using the destination information input on the screen of FIG. 6. Therefore, the user can notice incorrect content which has been input before the registration in the address book.

As described above, when the input field 606 is ON, the input fields 1003 and 1004 are displayed as blank fields, and the CPU 211 again receives input of authentication information from the user. Therefore, even if the connection can be established with the file server using the content input to the input fields 601 to 605, this does not necessarily mean that the transmission in step S906 can be successfully completed. In consideration of this point, the operation key 607 may be invalidated when the input field 606 is ON.

However, even when the input field 606 is ON, it is possible to confirm that the host name and the folder path are not incorrect (the host name which is input to the input field 602 exists on the LAN 100, and the folder path of the input field 603 exists in the file server). Therefore, in the present embodiment, regardless of whether the input field 606 is ON or OFF, the confirmation as to whether the connection can be established can be performed using the operation key 607.

Further, when the input field 606 is ON, the input fields 1003 and 1004 may not be blank fields. Instead, the content which is input to input fields 604 and 605 (the content registered in the address book) may be preset in an editable manner. In this case, the authentication information which is input to the input fields 604 and 605 is likely to be used for transmission of image data. Therefore, it enhances the effect of confirming whether the connection can be established.

Next, a second exemplary embodiment will be described. In the first exemplary embodiment, when the input field 606 is ON, the input fields 1003 and 1004 of the destination confirmation screen are displayed as blank fields, or the content which is input to the input fields 604 and 605 are preset in an editable manner in the input fields 1003 and 1004. In contrast, according to the second exemplary embodiment, it is presumed that information different from what has been input to the input fields 604 and 605 is preset in an editable manner in the input fields 1003 and 1004. The second embodiment is configured such that whether connection can be established is determined using preset authentication information. Similar constituent elements as those of the first exemplary embodiment are denoted by the same reference numerals.

FIG. 11 is a figure illustrating an example of an operation screen displayed on the operation unit 219. The operation screen illustrated in FIG. 11 can be operated only by an administrator of the MFP 101, and it is not displayed when an ordinary user operates the MFP 101. The administrator makes setting concerning handover of authentication information (selection of a mode) via the screen of FIG. 11.

When the administrator controls an operation key 1101, the authentication information is not handed over. When the administrator controls an operation key 1102, the authentication information is handed over. In the handover of the authentication information, the authentication information input by the user to log in to the MFP 101 is presented to the user as authentication information for transmission to the file server (for accessing a folder), and the user is allowed to use the information. When the administrator controls an operation key 1103, the authentication information stored in advance in association for each user (described below with reference to FIG. 12) is presented to the user as authentication information for transmission to the file server (for accessing a folder).

Figure 12:
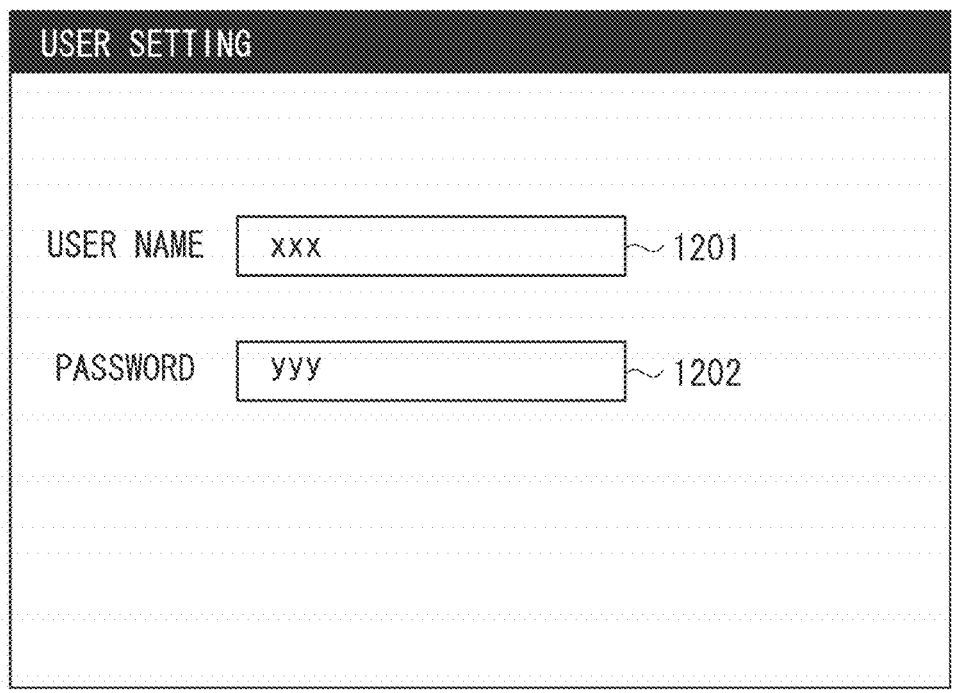
FIG. 12 is a figure illustrating an operation screen of an MFP according to an exemplary embodiment of the present invention.

FIG. 12 is a figure illustrating an example of an operation screen displayed on the operation unit 219. The screen of FIG. 12 is displayed when an ordinary user operates the MFP 101. The user inputs authentication information for accessing the folder (user name and password) into fields 1201 and 1202. When the user presses down an OK button, not illustrated, the authentication information input to the input fields 1201 and 1202 is stored in the HDD 214 in association with the user who is currently logging in to the MFP 101. The authentication is used when "registration for each user" in FIG. 11 is selected. Once the authentication information is stored, the authentication information can be used when the user logs in from the next time and thereafter.

FIG. 13 is a flowchart showing a log-in operation of the MFP 101 (a line of operations when the user starts to use the MFP 101). Each operation (step) shown in the flowchart of FIG. 13 is realized by the CPU 211 of the MFP 101 executing the control program stored in the HDD 214.

In step S1301, the CPU 211 receives the authentication information (user name and password) from the user via a log-in screen displayed on the operation unit 219.

In step S1302, the authentication information received in step S1301 is transmitted to the authentication server 102 to request the authentication server 102 to perform the user authentication (sends an inquiry about whether the user is allowed to use the MFP 101). In step S1303, according to the content notified from the authentication server 102, it is determined whether the authentication is OK or NG. When the authentication is determined to be OK (Yes in step S1303), the user is allowed to use the MFP 101, and the processing proceeds to step S1304. On the other hand, when the authentication is determined to be NG (No in step S1303), the processing is terminated as it is (or, the processing returns back to step S1301 to display the log-in screen again). In step S1304, the authentication information received in step S1301 is stored in the RAM 213 or the HDD 214. After the above processing, the user starts to operate the MFP 101.

Subsequently, in step S1305, the CPU 211 determines whether the user has given an instruction to log out from the MFP 101. When the CPU 211 determines that the user has given the instruction to log out from the MFP 101 (Yes in step S1305), the processing proceeds to step S1306. In step S1306, the authentication information stored in the RAM 213 or HDD 214 in step S1304 is erased.

FIG. 14 is a flowchart showing processing in step S703 of FIG. 7 in details. Each operation (step) illustrated in the flowchart of FIG. 14 is realized by the CPU 211 of the MFP 101 executing the control program stored in the HDD 214. In step S703 in the first exemplary embodiment, the CPU 211 tries to connect to the file server (access a folder) using information which is input in the input fields 601 to 605. On the other hand, in step S703 in the second exemplary embodiment, the CPU 211 tries to connect to the file server (access a folder) using authentication information of a type which is different dependent on the mode that is set on the screen of FIG. 11.

In step S1401, the CPU 211 determines whether the content input to the input field 606 is ON. When the CPU 211 determines that the content input to the input field 606 is ON (Yes in step S1401), the processing proceeds to step S1402. When the CPU 211 determines that the content input to the input field 606 is not ON (which means OFF; No in step S1401), the processing proceeds to step S1403.

In step S1402, the CPU 211 determines which mode is selected on the screen of FIG. 11. When the CPU 211 determines that [standard] mode is selected, the processing proceeds to step S1403. When the CPU 211 determines that [handover authentication information given at the time of log in to main body] mode is selected, the processing proceeds to step S1404. When the CPU 211 determines that [register for every user] mode is selected, the processing proceeds to step S1405.

In step S1403, the CPU 211 tries to connect to the file server (access a folder) using authentication information input to the input fields 601 to 605. In step S1404, the CPU 211 tries to connect to the file server (access a folder) using the information input to the input fields 601 to 603 and the user name and the password which are input in step S1301 of FIG. 13 at the time of log-in to the MFP 101.

In step S1405, the CPU 211 determines whether authentication information associated with each user is stored (the authentication information is registered via the screen of FIG. 12). When the CPU 211 determines that authentication information is stored (Yes in step S1405), the processing proceeds to step S1407. When the CPU 211 determines that the authentication information is not stored (No in step S1405), the processing proceeds to step S1406.

In step S1406, the CPU 211 tries to connect to the file server (access a folder) using the information input to the input fields 601 to 603 and assuming that the user name and the password are NULL. In step S1407, the CPU 211 tries to connect to the file server (access a folder) using the information input to the input fields 601 to 603 and using the user name and the password which are input to the input fields 1201 and 1202 of FIG. 12 and which are stored in association with each user.

Figure 15B:
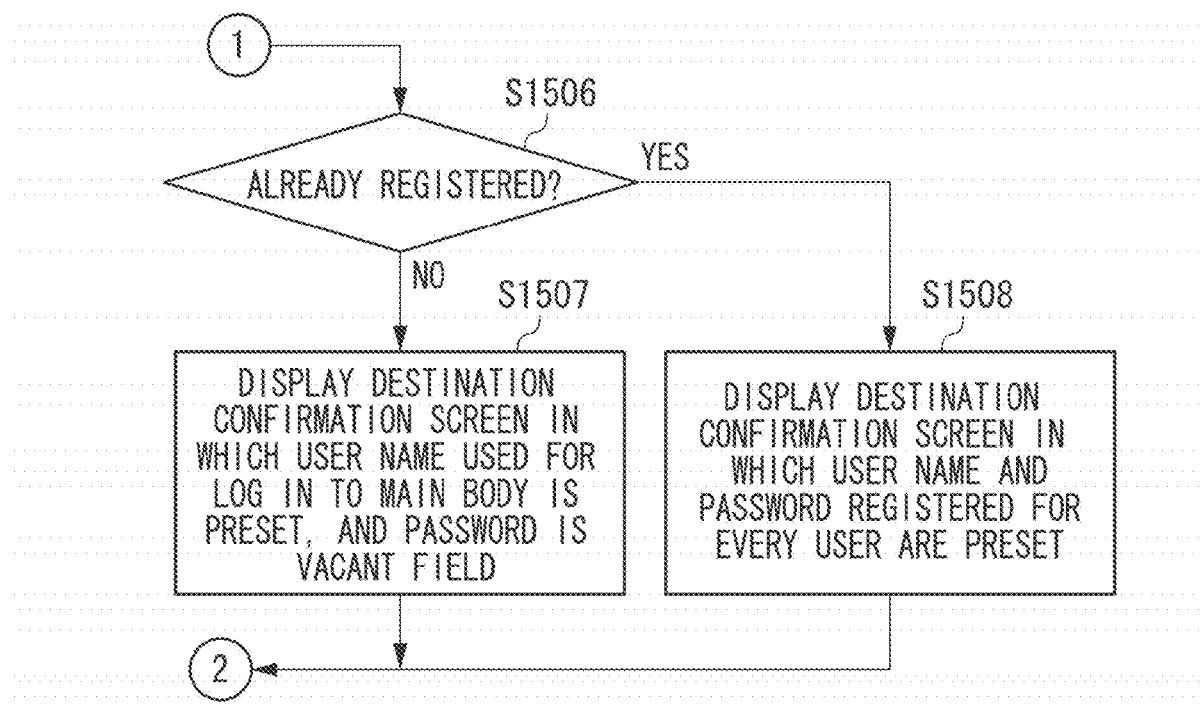

FIGS. 15A and 15B are a flowchart replacing FIG. 9, and is a flowchart showing transmission operation in the MFP 101. Each operation (step) shown in the flowchart of FIG. 15 is realized by the CPU 211 of the MFP 101 executing the control program stored in the HDD 214. The flowchart of FIG. 15 is started when transmission of image data is instructed (when the start key is pressed down).

In step S1501, the CPU 211 determines whether the destination is designated by referring to the address book. When the CPU 211 determines that the destination is designated by referring to the address book (Yes in step S1501), the processing proceeds to step S1502. When the CPU 211 determines that the destination is not designated by referring to the address book (No in step S1501, which means that it is a destination which the user has newly input with the operation key 412), the processing proceeds to step S1510.

In step S1502, the CPU 211 determines whether the content input in the input field 606 is ON. When the CPU 211 determines whether the content input in the input field 606 is ON (Yes in step S1502), the processing proceeds to step S1503. When the CPU 211 determines whether the content input in the input field 606 is not ON (which means OFF) (No in step S1502), the processing proceeds to step S1510.

In step S1503, the CPU 211 determines which mode is selected on the screen of FIG. 11. When the CPU 211 determines that [standard] mode is selected, the processing proceeds to step S1504. When the CPU 211 determines that [handover authentication information given at the time log in to main body] mode is selected, the processing proceeds to step S1505. When the CPU 211 determines that [register for every user] mode is selected, the processing proceeds to step S1506.

In step S1504, the same destination confirmation screen as that of step S903 is displayed. More specifically, the input fields 1001 and 1002 are displayed in a grayed-out state (i.e., editing disabled), and the host name and the folder path which are input to the input fields 602 and 603 of FIG. 6 and registered in the address book are preset in the input fields 1001 and 1002. The input fields 1003 and 1004 are displayed as blank fields, and the user inputs the authentication information (user name and password) for accessing a folder.

In the destination confirmation screen displayed in step S1505, likewise, the input fields 1001 and 1002 are displayed in a grayed-out state (i.e., editing disabled), and the host name and the folder path which are input to the input fields 602 and 603 of FIG. 6 and registered in the address book are preset in the input fields 1001 and 1002. However, the authentication information used at the time of log-in to the MFP 101 (the authentication information stored in step S1304) is preset in an editable state in the input fields 1003 and 1004. When the MFP 101 and the destination file server are managed in the same domain, and the same user can log in to both of them using the same authentication information, this [handover authentication information given at the time of log in to main body] mode is preferable.

In step S1506, the CPU 211 determines whether authentication information associated with each user is stored (authentication information is registered via the screen of FIG. 12). When the CPU 211 determines that authentication information is stored (Yes in step S1506), the processing proceeds to step S1508, and when the CPU 211 determines that authentication information is not stored (No in step S1506), the processing proceeds to step S1507.

In the destination confirmation screen displayed in step S1507, the input fields 1001 and 1002 are displayed in a grayed-out state (i.e., editing disabled), and the host name and the folder path which are input to the input fields 602 and 603 of FIG. 6 and registered in the address book, are preset in the input fields 1001 and 1002. The user name of the authentication information used for log-in to the MFP 101 (the authentication information stored in step S1304) is preset in an editable state in the input field 1003. The input field 1004 is displayed as a blank field.

In the destination confirmation screen displayed in step S1508, the input fields 1001 and 1002 are displayed in a grayed-out state (i.e., editing disabled), and the host name and the folder path which are input to the input fields 602 and 603 of FIG. 6 and registered in the address book, are preset in the input fields 1001 and 1002. The user name and the password which are input to the input fields 1201 and 1202 of FIG. 12 and stored in association with each user, are preset in an editable state in the input fields 1003 and 1004.

In step S1509, a determination is made as to whether transmission has been instructed (whether the user has pressed down the operation key 1005). When it is determined that the transmission has been instructed (Yes in step S1509), the processing proceeds to step S1510. When it is determined that the transmission has not been instructed (No in step S1509), the processing waits until the transmission is instructed. When the CPU 211 performs step S1504 and step S1507, the operation key 1005 may be disabled until the user enters input to the input fields 1003 and 1004.

In step S1510, the CPU 211 controls the scanner 221, and generates image data by reading an image on an original document. In step S1511, the destination folder is accessed by using the destination information which is input on the destination confirmation screen, and the image data generated in step S1510 are transmitted. When the destination is not designated by referring to the address book (it is a destination which is newly input using the operation key 412), then the folder is accessed by using the host name, the folder path, the user name, and the password which are newly input by the user. When the content input in the input field 606 is determined not to be ON (which means OFF), the folder is accessed by using the destination information input to the input fields 601 to 605 and registered in the address book.

As described above, in the second exemplary embodiment, a determination as to whether the connection with the file server can be established is made using authentication information of a type which is different dependent on the mode concerning the handover of the authentication information (a type of authentication information that is preset in an editable state on the destination confirmation screen). Therefore, a determination as to whether the connection can be established is made using the authentication information that is more likely to be actually used for transmission of image data, and this can further reduce a possibility of transmission error occurrence.

In the above embodiments, as an example, a case is described where, when the input field 606 is not ON, the CPU 211 uses the destination information input to the input fields 601 to 605 and registered in the address book. Alternatively, regardless of the input of the input field 606, the CPU 211 may determine whether connection can be established by using the authentication information of a type dependent on the mode selection in FIG. 11. In this case, image data may be transmitted using the authentication information of the type dependent on the mode selection in FIG. 11 without further displaying the destination confirmation screen.

In the first and second exemplary embodiments, as an example, the MFP 101 has been described, which receives the destination information indicating the folder in the file server and is capable of registering the received destination information in the address book. The MFP 101 is configured such that, after the MFP 101 receives the destination information from the user but before the destination information is registered in the address book, the MFP 101 determines whether the connection with the file server can be established using the destination information, and notifies the user of the determination. Therefore, this configuration can prevent destination information having incorrect content from being registered in the address book.

The image data which the MFP 101 transmits is not limited to the data generated by the scanner 221. For example, it may be image data which the MFP 101 receives from an external apparatus. The address book is not limited to what is stored in the MFP 101, and it may be an address book stored in an LDAP (Lightweight Directory Access Protocol) server provided in the LAN 101.

In the above embodiments, a software process has been described, in which the operation in each step included in each flowchart is realized using a processor and a memory. Alternatively, some of the steps may be configured as a hardware process. Still alternatively, a single step may be executed by combining a software process and hardware process.

Other Embodiments

An object of an exemplary embodiment of the present invention may also achieved by executing the following processing. More specifically, a storage medium storing a program code of software achieving the functions of the above embodiments is supplied to a system or an apparatus, and a computer (a CPU, an MPU, or the like) of the system or the apparatus may read and execute the program code stored in the storage medium.

In this case, the program code itself read from the storage medium achieves the functions of the above embodiments. Therefore, the program code and the storage medium storing the program code constitute an exemplary embodiment of the present invention.

According to an exemplary embodiment of the present invention, destination information having incorrect content is prevented from being registered in the address book.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-248031 filed Nov. 29, 2013, which is hereby incorporated by reference herein in its entirety.

What is claimed is:

1. An image processing apparatus which is able to transmit image data to a file server, comprising:
   a first display unit configured to display a first screen, in the first screen a list of destination information which has been registered in an address book and a registration request key being displayed, the destination information including destination information specifying a WebDAV server;
   a second display unit configured to display a second screen in response to operation of the registration request key, in the second screen an input area for inputting destination information indicating a folder in the WebDAV server and a connection determination key for determining whether a connection between the image processing apparatus and the WebDAV server can be established using the destination information being displayed;
   a determination unit configured to determine, in accordance with operation of the connection determination key, whether the connection can be established using the destination information
   a notification unit configured to notify a user of a determination result by the determination unit; and
   a registration unit configured to register the destination information in the address book.

2. The image processing apparatus according to claim 1, wherein, when the determination unit determines that the connection cannot be established, the notification unit further notifies the user of a reason why the connection is impossible.

3. The image processing apparatus according to claim 1, wherein the destination information further includes first authentication information for accessing the folder, and
   the determination unit makes the determination using the first authentication information.

4. The image processing apparatus according to claim 1, further comprising a permission unit configured to permit a user to use the image processing apparatus, based on second authentication information which is input by the user,
   wherein, when a first mode for transmitting image data using the second authentication information is set, the determination unit makes the determination using the second authentication information.

5. The image processing apparatus according to claim 4, wherein, in the first mode, the second authentication information is preset in a screen for allowing the user to confirm a destination.

6. The image processing apparatus according to claim 1, further comprising a holding unit configured to hold third authentication information associated with a user,
   wherein, when a second mode for transmitting image data using the third authentication information is set, the determination unit makes the determination using the third authentication information.

7. The image processing apparatus according to claim 6, wherein, in the second mode, the third authentication information is preset in a screen for allowing the user to confirm a destination.

8. The image processing apparatus according to claim 6, wherein, when the second mode is set, and the third authentication information is not held, the determination unit makes the determination without using any authentication information.

9. The image processing apparatus according to claim 1, further comprising
   a reading unit configured to generate image data by reading an image on an original document; and
   a transmission unit configured to transmit the image data generated by the reading unit.

10. The image processing apparatus according to claim 9, wherein the transmission unit transmits the image data according to SMB, FTP, or WebDAV.

11. The image processing apparatus according to claim 1, wherein the destination information for specifying the WebDAV server is a host name of the WebDAV server.

12. The image processing apparatus according to claim 1, wherein in the second screen a registration key for registering the destination information which has been input in the input area in the address book is further displayed.

13. The image processing apparatus according to claim 1, wherein in the second screen a selecting part for selecting a transmission protocol is further displayed, and
   wherein the determination unit determines, in accordance with operation of the connection determination key, whether the connection can be established using the destination information based on the transmission protocol selected by the selecting part.

14. A control method for controlling an image processing apparatus which is able to transmit image data, the control method comprising:
   displaying a first screen, in the first screen a list of destination information registered in an address book and a registration request key being displayed, the destination information including destination information specifying a WebDAV server;
   displaying a second screen in response to operation of the registration request key, in the second screen an input area for inputting destination information indicating a folder in the WebDAV server and a connection determination key for determining whether a connection between the image processing apparatus and the WebDAV server can be established using the destination information being displayed;
   determining, in accordance with operation of the connection determination key, whether the connection can be established using the destination information;
   notifying a user of a determination result by the determination; and
   registering the destination information in the address book.

15. A non-transitory computer readable storage medium storing executable instructions for causing a computer to execute a control method for controlling an image processing apparatus which is able to transmit image data to a file server, the control method comprising:
   displaying a first screen, in the first screen a list of destination information registered in an address book and a registration request key being displayed, the destination information including destination information specifying a WebDAV server;
   displaying a second screen in response to operation of the registration request key, in the second screen an input area for inputting destination information indicating a folder in the WebDAV server and a connection determination key for determining whether a connection between the image processing apparatus and the Web- DAV server can be established using the destination information being displayed;

determining, in accordance with operation of the connection determination key, whether the connection can be established using the destination information;

notifying a user of a determination result by the determination; and registering the destination information in the address book.

* * * * *